H. A. ROBINSON.
AEROPLANE FITTING.
APPLICATION FILED JUNE 4, 1919.
1,361,495.
Patented Dec. 7, 1920.
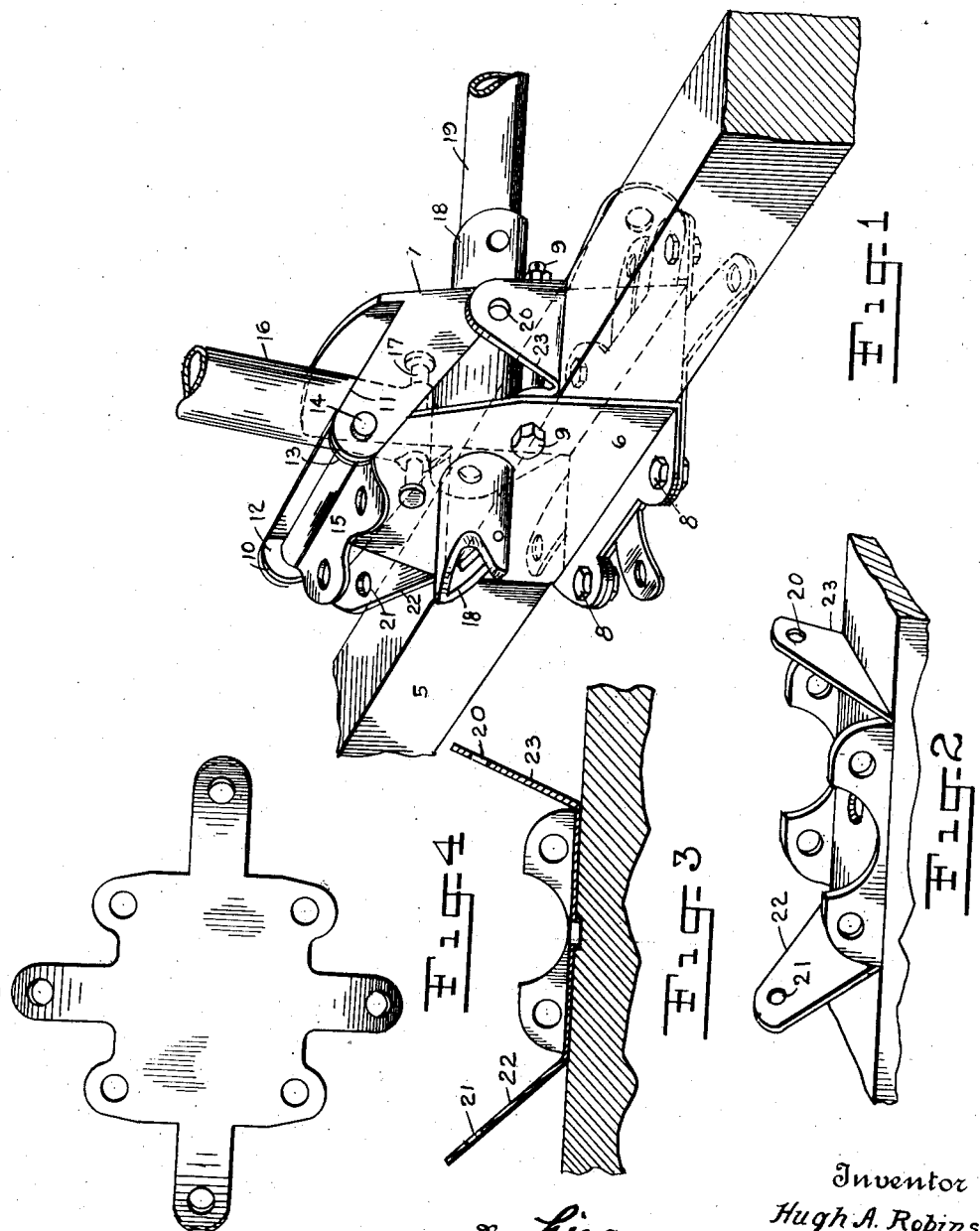
Inventor
Hugh A. Robinson
By Leo Attorney

UNITED STATES PATENT OFFICE.

HUGH A. ROBINSON, OF KEYPORT, NEW JERSEY.

AEROPLANE-FITTING.

1,361,495.

Specification of Letters Patent.  Patented Dec. 7, 1920.

Application filed June 4, 1919. Serial No. 301,676.

*To all whom it may concern:*

Be it known that I, HUGH A. ROBINSON, a citizen of the United States, residing at Keyport, in the county of Monmouth and State of New Jersey, have invented certain new and useful Improvements in Aeroplane-Fittings, of which the following is a specification, reference being had therein to the accompanying drawing.

My invention relates to improvements in aeroplane fittings and more particularly has reference to a fuselage tie tube fitting.

Referring to the accompanying drawings I have illustrated in Figure 1 in perspective partly broken away, a suitable form of fitting embodying an application of my invention. Fig. 2 is an enlarged perspective detail of part of the same. Fig. 3 is a side view of the same, and Fig. 4 is a plan view of the base plate.

5 indicates the longeron which is secured between the base plate shown to better advantage in Fig. 4 and the base of the side members 6—7 of the fitting by any suitable means such as the bolts 8. 9 indicates other bolts passing through said side members 6—7 for securing the member shown to better advantage in Figs. 2 and 3. 10—11 indicate lugs extending from the side plate 7 beyond the plate 6 which is also provided with lugs 12—13, all of said lugs being provided with holes and connected by the bolt 14 upon which the swinging member 15 is secured. 16 indicates a tubular fuselage strut pivotally secured upon the bolt 17 which passes through the plates 6—7 as shown, and 18 indicates a tube preferably brazed in the plates 6—7 and through which the tie tube 19 for the wings is passed as shown. The holes 20 and 21 in the lugs 22, 23 respectively are for the fuselage stay members or wires. This arrangement provides a strong and light fuselage tie tube fitting of few parts which can be easily and quickly assembled.

Of course it will be understood that various modifications may be made in the construction and arrangement of parts without departing from the spirit of the invention as claimed.

I claim:—

1. In a fitting of the class described, substantially parallel side members having laterally extending base flanges and adapted to engage opposite sides of a longeron, a base member adapted to engage the bottom of said longeron and adapted to be secured to the flanges of said side members, an interior member adapted to engage the top of said longeron and adapted to be secured between said side members, said side members also serving as an anchorage for a fuselage strut.

2. In a fitting of the class described, substantially parallel side members having laterally extending base flanges and adapted to engage opposite sides of a longeron, a base member adapted to engage the bottom of said longeron and adapted to be secured to the flanges of said side members, an interior member adapted to engage the top of said longeron and adapted to be secured between said side members, said side members also serving as a bearing for the tie tube for the wings.

3. In a fitting of the class described, substantially parallel side members having laterally extending base flanges and adapted to engage opposite sides of a longeron, a base member adapted to engage the bottom of said longeron and adapted to be secured to the flanges of said side members, an interior member adapted to engage the top of said longeron and adapted to be secured between said side members, said interior member having lugs and means in combination therewith for securing the fuselage wires.

In testimony whereof I hereunto affix my signature in the presence of two witnesses.

HUGH A. ROBINSON.

Witnesses:
LILLIAN DAVIDSON,
ANNA F. DUFFY.